United States Patent
Knecht et al.

(10) Patent No.: US 6,755,158 B2
(45) Date of Patent: Jun. 29, 2004

(54) VEHICLE CHARGE AIR COOLER WITH A PRE-COOLER

(75) Inventors: Wolfgang Knecht, Sluttgart (DE); Jörg Soldner, Ehningen (DE); Frank Vetter, Filderstadt (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 10/201,473

(22) Filed: Jul. 23, 2002

(65) Prior Publication Data

US 2003/0037913 A1 Feb. 27, 2003

(30) Foreign Application Priority Data

Jul. 27, 2001  (DE) .......................................... 101 36 861

(51) Int. Cl.⁷ ................................................ F01P 1/00
(52) U.S. Cl. ................... 123/41.56; 123/41.01
(58) Field of Search .......................... 123/41.01, 41.56, 123/41.58

(56) References Cited

U.S. PATENT DOCUMENTS

| | | | | |
|---|---|---|---|---|
| 3,782,115 A | * | 1/1974 | Johnson | ........................ 60/274 |
| 3,822,581 A | * | 7/1974 | Hauck et al. | ............... 73/23.31 |
| 4,273,082 A | * | 6/1981 | Tholen | ...................... 123/41.31 |
| 4,929,161 A | * | 5/1990 | Aoki et al. | .................... 418/83 |
| 6,363,892 B1 | * | 4/2002 | Zobel et al. | ............. 123/41.12 |

FOREIGN PATENT DOCUMENTS

| | | | |
|---|---|---|---|
| DE | 2923852 | * | 12/1979 |
| DE | 3200688 | * | 7/1983 |
| DE | 19820412 | * | 11/1999 |
| EP | 0678661 | * | 10/1995 |

* cited by examiner

*Primary Examiner*—Hoang Nguyen
(74) *Attorney, Agent, or Firm*—Wood, Phillips, Katz, Clark & Mortimer

(57) ABSTRACT

An air-cooled charge air cooler for vehicles with a coolant-filled pre-cooler oriented in an air collection tank of the charge air cooler. The pre-cooler is sized to contact a majority of the charge air entering the charge air cooler. The pre-cooler has flow paths carrying coolant between manifolds of the pre-cooler and the flow paths define channels therethrough to direct charge air through the pre-cooler and into a cooling grate of the charge cooler. The channels have a depth that allows for a corresponding adjustment in the length of the cooling grate of the charge air cooler while maintaining the overall space requirement for the charge air cooler in a vehicle and meeting the increasing performance requirements for such charge air coolers.

16 Claims, 4 Drawing Sheets

VEHICLE CHARGE AIR COOLER WITH A PRE-COOLER

FOREIGN PRIORITY

This application claims priority to DE 101 36 861.5, a German patent application filed Jul. 27, 2001, pursuant to 35 U.S.C. §119(a)–(d).

FIELD OF THE INVENTION

This invention pertains to charge air coolers for vehicles and more particularly to such charge air coolers that include a pre-cooler arranged in a collection tank of the charge air cooler.

BACKGROUND OF THE INVENTION

Charge air coolers that have opposing inlet and outlet collection tanks fluidly connected by tubes that direct the charge air from the inlet tank of the charge cooler to the outlet tank of the charge cooler are known to include a second heat exchanger.

One example of such a charge air cooler is shown in DE 32 00 688 A1 in which the second heat exchanger consists of inflow and outflow coolant-filled lines (22, 23) with flat tubes or channels branching off these lines. The coolant-filled lines branching off of the inflow and outflow lines (22, 23) do not provide pre-cooling. Rather, these branched tubes are in parallel arrangement to air-cooled tubes and form a stacked construction alternating with the air-cooled tubes. Cooling of the charge air takes place by heat exchange between the charge air and cooling air of the charge cooler and also by heat exchange between the charge air and the coolant of the engine. This cooling method can allow a compact cooling system and easy adjustment to the varying loads of charge air supplied by the internal combustion engine. However, heat transfer may not be as efficient as desired and such charge coolers can be costly to manufacture and therefore have not been of significant use in practice.

A two-stage charge cooler is shown in DE 29 23 852 A. The first stage is a charge cooler that is cooled by the coolant of an internal combustion engine with the second stage being a charge cooler that is cooled by air and mechanically connected directly to the first stage charge cooler.

At least some charge coolers have exhibited short life spans due, at least in part, to the solder connections used in their manufacture because of temperature differences between the charge air and the cooling air or cooling liquid that do not occur in other types of heat exchangers in the vehicle field.

It is also known to arrange water-cooled heat exchangers, such as oil coolers or condensers, in a coolant collecting tank of coolant/air radiators to cool another fluid of the vehicle, such as oil or refrigerant. Such arrangements seek to utilize the cooling capacity of the engine coolant to satisfy other cooling demands of the vehicle, such as oil cooling or refrigerant condensing. Examples of such arrangements are shown in DE 198 20 412 A1 and EP 0 678 661 B1.

Looking forward, the exhaust limits of vehicles, particularly those with diesel engines, will place larger demands on heat exchanger manufacturers. The temperatures of the charge air exiting the charge cooler must be reduced much farther than in prior applications even though the charge air entering the charge cooler will have much higher temperatures than in prior applications. These conditions must preferably be met without requiring significantly larger design space for the charge air cooler.

BRIEF SUMMARY OF THE INVENTION

In one form, the invention provides an air-cooled charge air cooler for vehicles. The charge air cooler has a pre-cooler oriented in an air collection tank of the charge cooler. The pre-cooler contains flow paths for a coolant and channels located between the coolant flow. The pre-cooler is sized to contact a majority of charge air flow entering the charge air cooler. The channels have a depth that allows for corresponding adjustment in the length of the cooling grate of the charge air cooler while maintaining the overall space requirement for the charge air cooler in a vehicle and meeting the increasing performance requirements of such charge air coolers.

In one form, the charge air cooler has an inlet collection tank on the opposite end from an outlet collection tank. A row of tubes fluidly connects the inlet and outlet tanks to direct a charge air flow from the inlet tank to the outlet tank. Heat exchange elements are arranged between the tubes to form a cooling grate through which a cooling airflow is directed. A pre-cooler is in the inlet collection tank and extends over a cross-sectional area of the inlet collection tank such that a majority of the charge air must pass through the pre-cooler. The pre-cooler has flow paths to direct a coolant flow therethrough and channels between the flow paths for charge air flow. The channels have a depth that is substantially perpendicular to the cross-sectional area of the inlet tank that is occupied by the pre-cooler and the depth is in a range of about 25 mm to about 200 mm.

According to one form, the channels have a depth in the range of about 40 mm to about 120 mm.

In one form, the flow paths of the pre-cooler are flat tubes. According to one form, the flat tubes extend in a perpendicular orientation relative to the tubes of the cooling grate.

In yet another form of the invention, a series of heat exchangers are arranged in a box-like array and one of these heat exchangers is an air-cooled charge air cooler including an inlet collection tank on the opposite end from an outlet collection tank. A row of tubes fluidly connects the inlet and outlet tanks and directs charge air from the inlet tank to the outlet tank. Heat exchange elements are arranged between the tubes to form a cooling grate through which a cooling airflow is directed. A pre-cooler is in the inlet collection tank and extends across a cross-sectional area of the inlet collection tank such that a majority of the charge air flow must pass through the pre-cooler. The pre-cooler has flow paths to direct a coolant flow therethrough and channels between the flow paths for the charge air flow. Each of the collection tanks extends roughly parallel and adjacent to a collecting tank of another of the series of heat exchangers to form an edge of the box-like array.

Objects and advantages of the invention, as well as additional inventive features, will be apparent from the description of the invention provided herein and in the associated figures and appended claims.

DETAILED DESCRIPTION OF THE INVENTION

Figure 1:
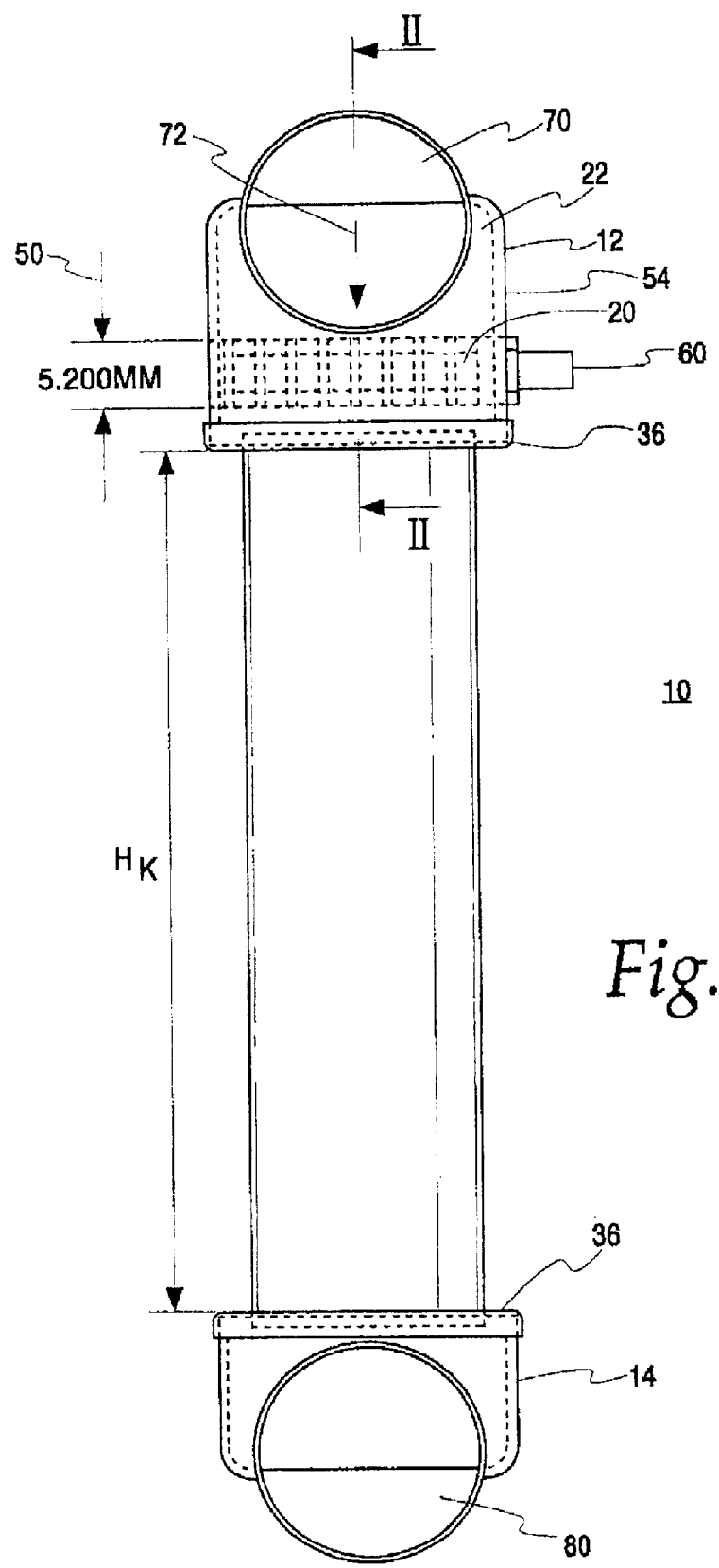
FIG. 1 is a side view of a charge air cooler embodying the invention.
Figure 2:
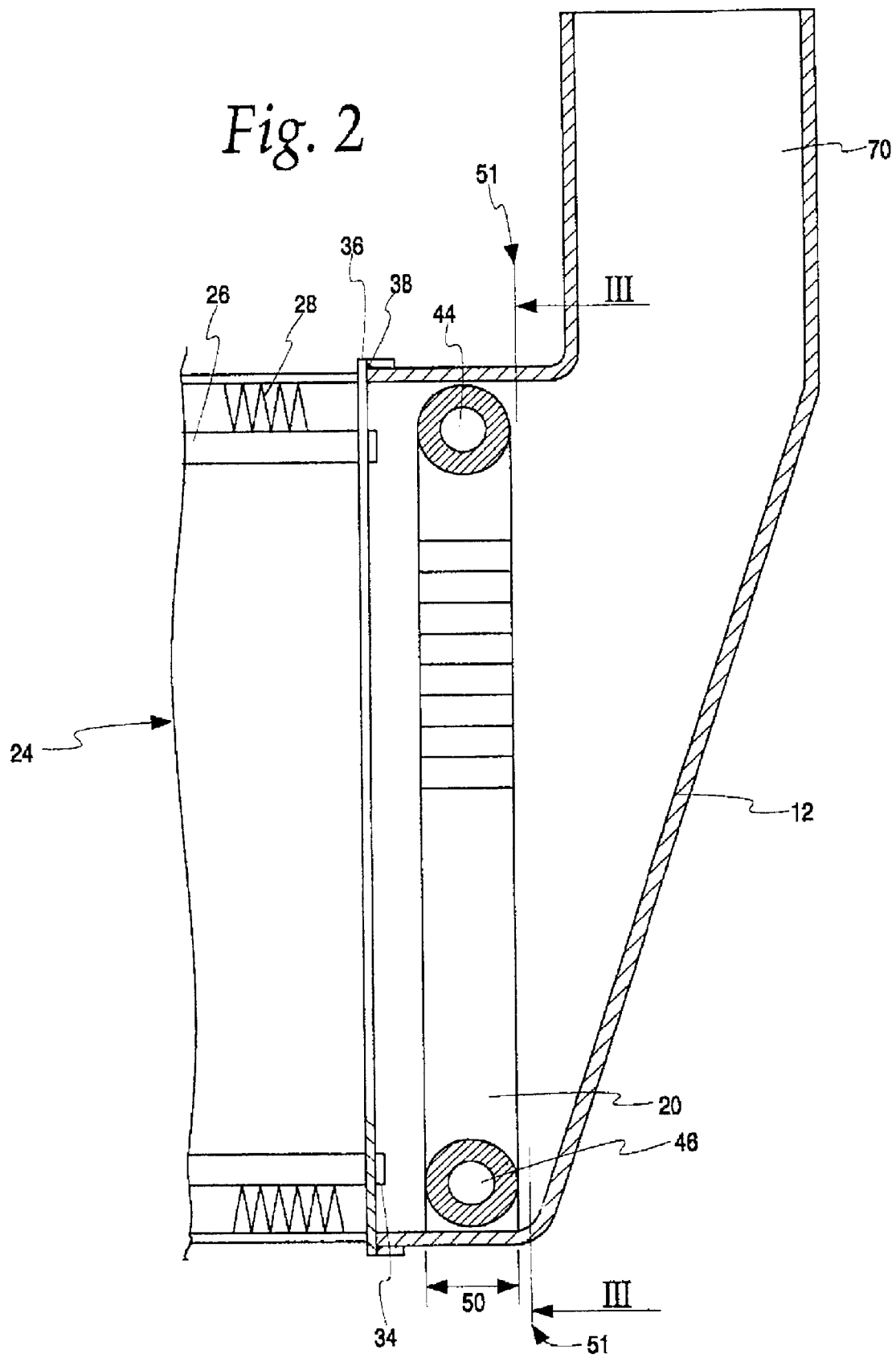
FIG. 2 is a cross-section taken from line II—II of FIG. 1.

A charge air cooler 10 embodying the present invention is represented in FIG. 1 and depicts an inlet collection tank 12 at the opposite end of the charge air cooler 10 from an outlet collection tank 14 for directing a charge air flow through the charge air cooler 10. The inlet collection tank 12 of FIG. 1 is larger than the outlet collection tank 14 in order to accommodate a pre-cooler 20. The larger cross-section 22 of the inlet collection tank 12 is depicted in FIGS. 1 and 2. The pre-cooler may be manufactured of aluminum or stainless steel and is mechanically fastened, for example by screws, flanges and seals (not shown) to the collection tank 12 in which it is installed. The collection tanks 12, 14 may be manufactured of aluminum or stainless steel.

Figure 3:
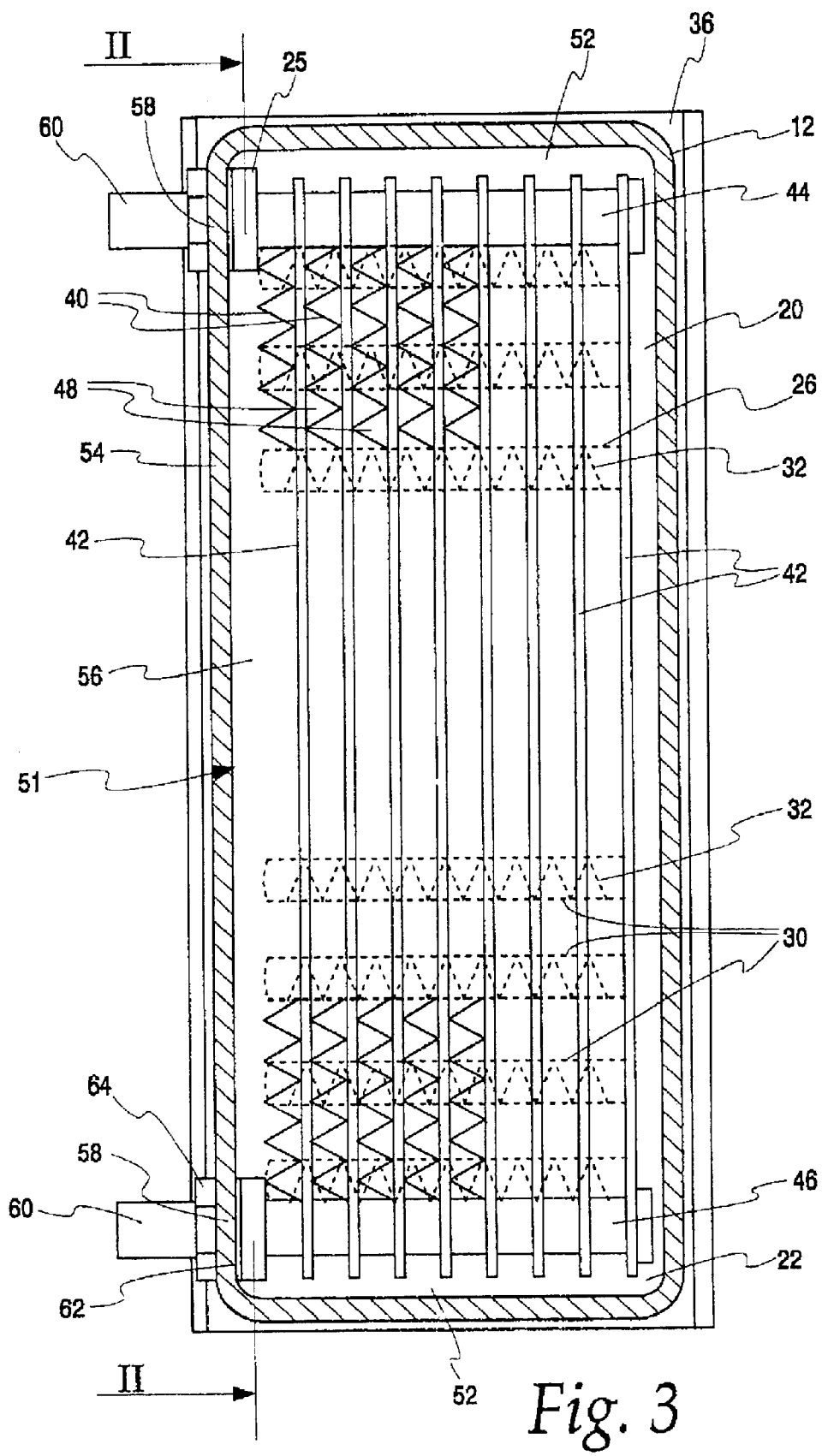
FIG. 3 is a cross-section taken from line III—III of FIG. 2.

An air-cooled cooling grate 24 is formed by a combination of spaced, flat tubes 26 for the charge air flow and heat exchange elements 28 between the tubes 26 as shown in FIG. 2. In FIG. 2 only the outer heat exchange elements 28 and tubes 26 are shown. Ordinarily, rows of tubes 26 and heat exchange elements 28 line the entire internal width of the charge cooler 10. The heat exchange elements 28 may be serpentine fins or corrugated ribs. The arrangement consists of the tubes 26 for the charge air flow alternating with the corrugated ribs 28 for a cooling air flow. The heat exchange elements 28 lie against a flat side 30 of the tubes 26. The tubes 26 may contain internal inserts 32 as shown in FIG. 3. The tubes 26 have openings 34 at both ends fluidly connecting the inlet collection tank 12 to the outlet collection tank 14 to direct the charge air flow through the charge cooler. More specifically, the ends of the tubes 26 are inserted into respective tube plates 36 that are connected to collection tanks 12, 14, for example by a weld seam 38. The tubes 26 and heat exchange elements 28 may have a suitable solder coating and, therefore, may be assembled in a soldering furnace.

FIG. 1 depicts only a single row of tubes 26, however, the air-cooled charge air cooler 10 may have several rows of tubes 26 arranged next to each other. The length of the grate 24 formed by the tubes 26 and heat exchange elements 28 is depicted in FIG. 1 as $H_k$. This length may be reduced to accommodate the pre-cooler 20 while retaining the space requirements of a charge air cooler 10 without the pre-cooler 20. The length $H_k$ of the cooling grate 24 relative to the size of pre-cooler 20 will be discussed in more detail later in this specification in connection with FIG. 4.

The pre-cooler 20 has serpentine fins or corrugated ribs 40 for the charge air flow and flow paths 42 for a coolant of the vehicle with the flow paths 42 being shown in FIG. 3 as flat tubes 42. The components of the pre-cooler 20, like those of the cooling grate 24, may have a suitable solder coating and may also be assembled in a soldering furnace. Alternatively, either the pre-cooler 20 or the cooling grate 24 materials may be brazed together. The pre-cooler 20 has two coolant manifolds 44, 46 in fluid communication with the flow paths 42 with one of the manifolds 44, 46 being a coolant inlet manifold 44, and the other being a coolant outlet manifold 46. The flow paths 42 alternate with channels 48 containing the fins 40 and having a depth 50 as seen in FIG. 2. The depth 50 of the channels 48 is sized to correspond to an adjustment in the length Hk of the cooling grate 24 of the charge air cooler 10 while maintaining the overall size requirements of the charge air cooler 10.

In order to maximize contact with the flow of charge air entering the charge air cooler 10, the pre-cooler 20 is preferably sized to occupy, as tightly as is practicable, a large cross-section 51 of the inlet collection tank 12. For example, FIG. 3 shows a large cross-section 51 of the inlet collection tank 12 in which the pre-cooler 20 preferably fits as tightly as is practicable. As such, in FIG. 3, the perimeter area 52 near the wall 54 of the inlet collection tank 12 is preferably occupied largely by the flow paths 42 of the pre-cooler 20, and the pre-cooler 20 flow paths 42 may extend beyond the coolant manifolds 44, 46 in the space between the manifolds 44, 46 and the walls of the tank 12 to increase the area of the cross-section 51 occupied by the pre-cooler 20. The flow paths 42 preferably extend substantially parallel to the tube plates 36 at the ends of the tubes 26 as best seen in FIG. 2. This parallel orientation of the flow paths 42 relative to the tube plates 36 is not essential and the pre-cooler 20 may be arranged in an oblique position relative to the tube plate 36. The pre-cooler 20 occupying as much of the cross-sectional area 51 as is practical is more important than the orientation. The first channel 56 of the pre-cooler 20 arranged between the wall 54 of the inlet collection tank 12, as shown in FIG. 3, may be wider than the other channels 48 to allow easier assembly, and a corrugated rib 40 may also be placed in this channel 56.

For assembly, the flow paths 42 of the pre-cooler 20 can be half-shells that are assembled into a flat tube and the manifolds 44, 46 can be formed from cups drawn from half-shells such that two halves of the pre-cooler 20 can be soldered or brazed together. Drawn or welded flat tubes can be used for the flow paths 42, provided the tubes are perforated at the ends to couple with the coolant manifolds 44, 46 that would be fitted with openings, rings and seals (not shown) to maintain fluid communication between the flow paths 42 and the manifolds 44, 46 of the pre-cooler 20.

The wall 54 of the inlet collection tank 12 contains openings 58 to accommodate connectors or fittings 60. The connectors 60 are mechanically fastened, for example screw-threaded, into the openings 58 and into a seal 62. The connectors 60 of FIG. 3 are secured in the opening with nuts 64. Alternatively, the connectors 60 may be welded into the openings 58.

As one example of operation of the charge air cooler 10, hot air of roughly 300° C. flows into the inlet collection tank 12 through a charge air inlet 70 in the direction indicated by the arrow 72 in FIG. 1 and through the channels 48 of the pre-cooler 20. The pre-cooled charge air then enters the tubes 26 of the cooling grate 24. The orientation of the channels 48 of the pre-cooler 20 intersects the flat sides 30 of the tubes 26 so that the charge air is directed into the tubes 26 without significant pressure loss. Although the orientations of the channels 48 and tubes 26 intersect, they both lie in a common fluid flow direction as indicated by arrow 72. The charge air exits the tubes 26 into the outlet collection tank 14 and through an air charge outlet 80.

The charge air cooler 10 containing the pre-cooler 20 can be incorporated into a cooling system that comprises several heat exchangers arranged in a box-like configuration in which the heat exchangers adjacent to the collecting tank 12 each form one edge of the cooling system. Each of the collection tanks extend roughly parallel and adjacent to a collecting tank of another of the heat exchangers in the series to form an edge of the box-like array. Published Application DE 100 45 987 shows one such system and be referenced for additional detail. The charge air flow may enter the cooling system axially and then flow radially through the heat exchangers. When the adjacent heat exchanger of the cooling system is a coolant cooler, or radiator, very short coolant flow paths may be provided between the adjacent heat exchanger and the pre-cooler 20 such that the coolant of the adjacent heat exchanger can be taken from the collecting tank of the adjacent heat exchanger and directed into the pre-cooler 20 manifolds 44, 46, circulated through the pre-cooler 20 and then returned to the adjacent collecting tank. Flow openings may be provided in the adjacent collecting tank for this purpose, with the coolant flow paths provided in the form of inserts in the flow openings that direct part of the coolant from the collecting tank into the pre-cooler 20 and then, after flowing through the pre-cooler 20, back into the collecting tank of the adjacent heat exchanger.

The depth 50 of the channels 48 defines the depth of the pre-cooler 20. An optimum range of pre-cooler depth 50 was determined by comparing the outlet temperature of the charge air from the charge air cooler 10 and the depth 50 of the pre-cooler 20 as related the length $H_k$ of the cooler grate 24 of the charge air cooler 10. The results of this comparison were plotted and are depicted in FIG. 4.

Figure 4:
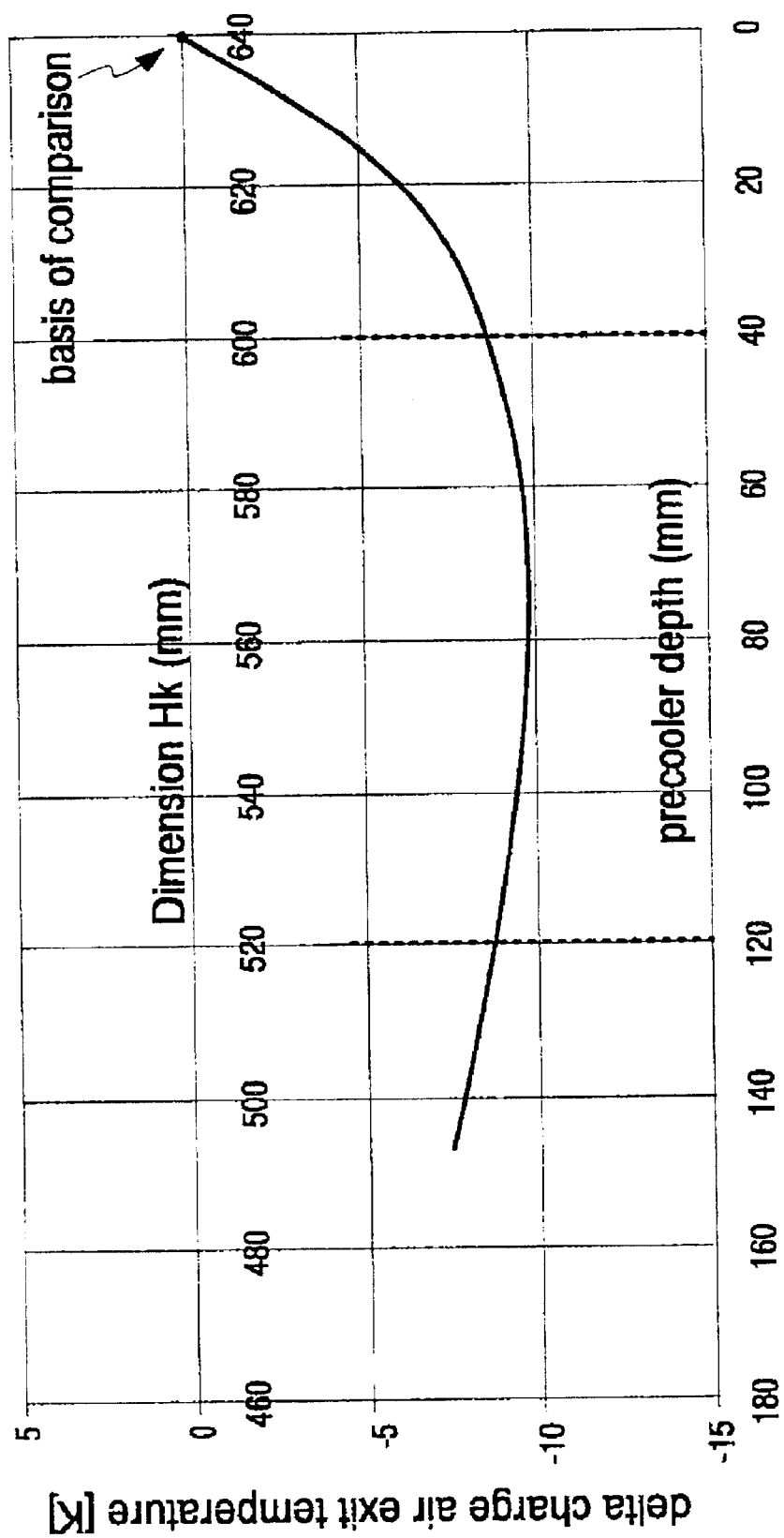
FIG. 4 is a graph depicting the relationship between the outlet temperature of the charge air cooler to the dimensions of the pre-cooler.

FIG. 4 depicts a curve that was plotted to show the relationship between the outlet temperature of the charge air cooler 10 and depth 50 of the channels 48 of the pre-cooler 20. The curve depicted in FIG. 4 is the result of experiments designed to compare the outlet temperature from a charge air cooler with a length $H_k$ of about 640 mm without pre-cooling to the outlet temperature of a charge air cooler 10 of roughly the same size with a pre-cooler. The experiments were conducted under the conditions and temperatures of the cooling air prevailing in the vehicle field, with the cooling air of the charge air cooler 10 having a temperature of about 40° C., the coolant flow to the pre-cooler 20 having a temperature of about 100° C., and the charge air entering the inlet collection tank 12 having a temperature of about 300° C. The difference in charge air outlet temperature is plotted on the left vertical axis and represents the outlet temperature difference between using a charge cooler without pre-cooling and a charge cooler of roughly the same size with a pre-cooler 20. The depth 50 of the pre-cooler 20 is plotted on the lower horizontal axis. A depth 50 of about 25 mm was assumed as a minimum depth 50 for purposes of the investigation. The upper horizontal axis shows the length $H_k$ of the cooling grate 24. It was assumed that the temperature of the employed cooling air could not be influenced. The efficiency of heat transfer is also dictated by the configuration of the cooling grate 24. The length $H_k$ of the cooling grate 24 was necessarily varied to maintain overall space requirements during the collection of data plotted in FIG. 4.

According to the results depicted in FIG. 4, the optimum depth 50 of the pre-cooler 20 is in the range of about 25 mm to about 200 mm, and preferably between about 40 mm and 120 mm with the greatest temperature advantages occurring with a depth 50 of between about 60 mm and about 80 mm. A pre-cooler 20 depth 50 above 200 mm did not yield a corresponding cooling grate 24 length $H_k$ that would maintain the space requirement of the charge air cooler 10. At depths 50 that exceed 200 mm, the temperature of the charge air leaving the charge air cooler 10 rises significantly and the temperature difference between the outlet temperatures of the charge air cooler 10 with pre-cooling and charge cooler without pre-cooling becomes significantly smaller. Additionally, a depth 50 of greater than about 200 mm results in detectably higher pressure loss of the charge air through the charge air cooler 10.

Use of the pre-cooler 20 can provide an overall greater reduction in temperature of the charge air in the space currently required by utility vehicle manufacturers. The space requirements can be maintained by limiting the depth of the pre-cooler 20, and effectively the depth 50 of the channels 48, to between about 25–200 mm. The channels 48 of the pre-cooler 20 can ensure uniform air flow to the flat tubes 26 of the cooling grate 24 within the charge air cooler 10, reducing the likelihood of overloading of the individual flat tubes 26. The temperature differences between the cooling air and the charge air entering the flat tubes 26 can be reduced by pre-cooling and thereby sharp stresses on materials are reduced, as are the frequencies of failures. Overall, the cooling output of the charge air cooler 10 can be increased in a space of equal size in comparison to conventional charge coolers so that the requirements of the utility vehicle manufacturers are met.

Recitation of ranges of values herein also serves as a shorthand method of referring individually to each separate value falling within the range, unless otherwise indicated herein, and each separate value is incorporated into the specification as if it were individually recited herein. The use of any and all examples, or exemplary language (e.g., "such as" or "for example") provided herein, is intended merely to better illuminate the invention and does not pose a limitation on the scope of the invention unless expressly recited in a claim.

While some potential advantages and objects have been expressly identified herein, it should be understood that some embodiments of the invention may not provide all, or any, of the expressly identified advantages and objects.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air-cooled charge air cooler for vehicles, comprising:
   an inlet collection tank on an opposite end of said charge cooler from an outlet collection tank;
   at least one row of tubes fluidly connected to the tanks to direct a charge air flow between the tanks;
   heat exchange elements arranged between the tubes to form a cooling grate through which a cooling airflow may be directed; and
   a pre-cooler in the inlet collection tank and extending over a cross-sectional area of the inlet collection tank so that a majority of the charge air flow must pass through the pre-cooler, the pre-cooler including flow paths to direct a coolant flow therethrough and channels between the flow paths for the charge air flow, the channels having a depth substantially perpendicular to the cross-sectional area in the range of about 25 mm to about 200 mm.

2. The charge air cooler of claim 1 wherein the channels have a depth in the range of about 40 mm to about 120 mm.

3. The charge air cooler of claim 1 wherein the flow paths of the pre-cooler are flat tubes.

4. The charge air cooler of claim 3 wherein the flat tubes and the tubes of the cooling grate extend perpendicularly to each other.

5. The charge air cooler of claim 1 wherein the tubes of the cooling grate contain internal inserts.

6. The charge air cooler of claim 1 wherein the heat exchange elements are serpentine fins.

7. The charge air cooler of claim 1 wherein each of the tubes of the cooling grate has a first open end opposite a second open end, each end received in an associated opening of a tube plate, each of the tube plates connected to one of the inlet collection tank and the outlet collection tank.

8. The charge air cooler of claim 7 wherein the flow paths of the pre-cooler extend substantially parallel to the tube plate associated with the first open end of the conduit.

9. The charge air cooler of claim 1 further comprising a coolant manifold in fluid communication with the flow paths of the pre-cooler.

10. The charge air cooler of claim 9 wherein the coolant manifold further comprises a connector releasably attached to an opening in a wall of the inlet collection tank.

11. The charge air cooler of claim 9 wherein the coolant manifold further comprises a connector fixedly attached to an opening in a wall of the inlet collection tank.

12. The charge air cooler of claim 1 wherein the pre-cooler further comprises a coolant inlet manifold parallel to a coolant outlet manifold; and wherein the flow paths are parallel flat tubes and the parallel flat tubes extend between the inlet and outlet coolant manifolds of the pre-cooler to direct the coolant therethrough.

13. The charge air cooler of claim 1 wherein the pre-cooler is manufactured from materials selected from the group of aluminum and stainless steel.

14. The charge air cooler of claim 13 wherein the pre-cooler is soldered together.

15. The charge air cooler of claim 13 wherein the pre-cooler is brazed together.

16. A cooling system for a vehicle, the system comprising:
a series of heat exchangers arranged in a box-like array;
one of the heat exchangers being an air-cooled charge air cooler including:
an inlet collection tank on an opposite end of said charge cooler from an outlet collection tank;
at least one row of tubes fluidly connected to the tanks to direct a charge air flow between the tanks;
heat exchange elements arranged between the tubes to form a cooling grate through which a cooling airflow may be directed; and
a pre-cooler in the inlet collection tank and extending over a cross-sectional area of the inlet collection tank so that a majority of the charge air flow must pass through the pre-cooler, the pre-cooler including flow paths to direct a coolant flow therethrough and channels between the flow paths for the charge air flow; and
each of the collection tanks extending parallel and adjacent to a collecting tank of another of the series of heat exchangers to form an edge of the box-like array.

* * * * *

UNITED STATES PATENT AND TRADEMARK OFFICE
CERTIFICATE OF CORRECTION

PATENT NO. : 6,755,158 B2
DATED : June 29, 2004
INVENTOR(S) : Wolfgang Knecht et al.

It is certified that error appears in the above-identified patent and that said Letters Patent is hereby corrected as shown below:

<u>Title page</u>,
Item [75], Inventors, should read -- Wolfgang Knecht, Stuttgart (DE); Jörg Soldner, Ehningen (DE); Frank Vetter, Filderstadt (DE); Steven P. Meshenky, Rancine, WI; Robert J. Barfjnecht, Waterford, WI --.

Signed and Sealed this

Eleventh Day of October, 2005

JON W. DUDAS
*Director of the United States Patent and Trademark Office*